United States Patent [19]

Hug

[11] 3,878,606

[45] Apr. 22, 1975

[54] CABLE GAGE AND CUTTER GUIDE TOOL

[75] Inventor: Norman L. Hug, Cypress, Calif.

[73] Assignee: McDonnell Douglas Corporation, Santa Monica, Calif.

[22] Filed: Mar. 19, 1974

[21] Appl. No.: 452,532

[52] U.S. Cl. .................................. 30/90.1; 81/9.5 C
[51] Int. Cl. .............................................. B21f 13/00
[58] Field of Search .......... 30/90.1, 90.2, 90.6, 286, 30/288, 289; 81/9.5 C

[56] References Cited
UNITED STATES PATENTS

| | | | |
|---|---|---|---|
| 1,725,114 | 8/1929 | Van Gelderen | 81/9.5 C |
| 2,120,398 | 6/1938 | Edwards et al. | 30/90.6 |
| 2,455,591 | 12/1948 | Lindsay | 30/90.1 |
| 2,678,491 | 5/1954 | Thomas | 30/90.1 X |
| 2,984,905 | 5/1961 | Harmon | 81/9.5 C |
| 3,161,088 | 12/1964 | Tolman | 81/9.5 C |
| 3,257,725 | 6/1966 | Dignard | 30/90.1 UX |
| 3,304,605 | 2/1967 | Stark | 30/90.1 |
| 3,548,691 | 12/1970 | Horrocks | 81/9.5 C |

Primary Examiner—Al Lawrence Smith
Assistant Examiner—J. T. Zatarga
Attorney, Agent, or Firm—D. N. Jeu; Walter J. Jason; Donald L. Royer

[57] ABSTRACT

A tool for gaging concentricity of a coaxial cable and guiding a cutting blade to provide accurate termination lengths of the cover jacket, braided shield and dielectric insulation layers at an end of the cable for attachment of a connector thereon. The tool illustratively comprises a tubular member including an axial passageway formed of a larger bore joined concentrically in series with a smaller bore, a plurality of transverse slots extending to predetermined depths into the larger and smaller bores for positioning the cutting blade at correct termination lengths of the jacket, shield and insulation of the cable end suitable inserted into the tubular member, and a transverse cutout extending a predetermined depth into the larger bore, the slots extending into the larger bore being generally located diametrically opposite to the cutout whereby thumb pressure can be maintained against the cable end through the cutout during a trimming operation.

10 Claims, 4 Drawing Figures

CABLE GAGE AND CUTTER GUIDE TOOL

BACKGROUND OF THE INVENTION

My present invention relates generally to tools used in connection with the processing and termination of the ends of electric cables and wires. More particularly, the invention relates to a coaxial cable gage and cutter guide tool.

Coaxial cables are, of course, often and widely used with complex and sensitive electrical apparatus and electronic equipment carried in modern aircraft and missiles. The coaxial cable commonly includes, for example, a cover jacket, braided shield, dielectric insulation and center conductor concentrically arranged in cable form. A relatively large number of these cables are being required in aerospace usage, and it is important that all of the cable ends are properly processed to provide accurate termination lengths of the jacket, shield, insulation and conductor for each cable so that a good and secure connection lug can be readily attached or conventionally crimped to the end of the cable. This not only requires smooth and even cuts to provide accurate termination lengths but it is also necessary that the concentricity of the jacket, the shield and the insulation in relationship to the conductor be within specified limits. Excessive variation of such concentricity was, however, one of the major problems encountered in achieving good and secure connectors on the ends of coaxial cables.

U.S. Pat. No. 3,304,605 of Frank B. Stark for Cable Stripping Device patented Feb. 21, 1967 was found during a novelty search on the present invention, and discloses and claims a tool for stripping insulated and shielded coaxial cable. The tool generally comprises a tubular member including an axial bore to receive a cable end, an apertured end wall defining a stop for the cable end inserted into the bore, and a series of axially spaced slots on the tubular member to receive a cutting blade for performing a series of spaced cuts of different depths in the inserted cable end to remove corresponding layers therefrom. The Stark device, however, is not constructed to attain smooth and even cuts of the normally tough cover jacket, the hard braided (metallic) shield and the tenacious dielectric insulation, or to permit verification of the concentricity and correct diameters of the cable (outer jacket) and its inner insulation.

SUMMARY OF THE INVENTION

Briefly, and in general terms, my invention is preferably accomplished by providing a tool which allows a tactual and visual gaging of the concentricity and diameters of at least an outer and an inner surface of an end of a coaxial cable and, at the same time, permits guiding of a cutting blade to produce accurate termination lengths of the cover jacket, braided shield and dielectric insulation layers of the cable end for attachment of a connection lug thereon. The tool comprises a tubular member structured so that it includes an axial passageway formed of a larger bore joining with a smaller bore. This concentric series arrangement and the selected diameters of the larger and smaller bores will allow an adequate confirmation of the concentricity and diameters of the jacket and insulation layers when the cable end is suitably inserted into the two bores.

The tool also includes three transverse slots in the tubular member, two of the slots extending into the larger bore and the other one extending into the smaller bore. A larger transverse cutout in the tubular member extends a predetermined depth into the larger bore and is generally located diametrically opposite to the two slots extending into the larger bore. A smaller transverse cutout similar to the larger one is axially spaced a predetermined distance therefrom. The three slots are of predetermined depths, and axially spaced in the tubular member such that accurate termination lengths of the jacket, shield and insulation layers of the cable end inserted in the tubular member can be produced by using the cutting blade in each of the slots. Thumb pressure can be maintained through the larger cutout on the cable end during any trimming operation, and the separating tubular member length between the larger and smaller cutouts assists in preventing buckling of the cable end during such operation.

BRIEF DESCRIPTION OF THE DRAWING

My invention will be more fully understood, and other advantages and features thereof will become apparent, from the following description of an exemplary embodiment of the invention. The description is to be taken in conjunction with the accompanying drawing, in which.

DESCRIPTION OF THE PRESENT EMBODIMENT

In the following description and accompanying drawing of an exemplary embodiment of my invention, some specific dimensions and types of materials are disclosed. It is to be understood, of course, that such dimensions and types of materials are given as examples only and are not intended to limit the scope of this invention in any manner.

Figure 1:
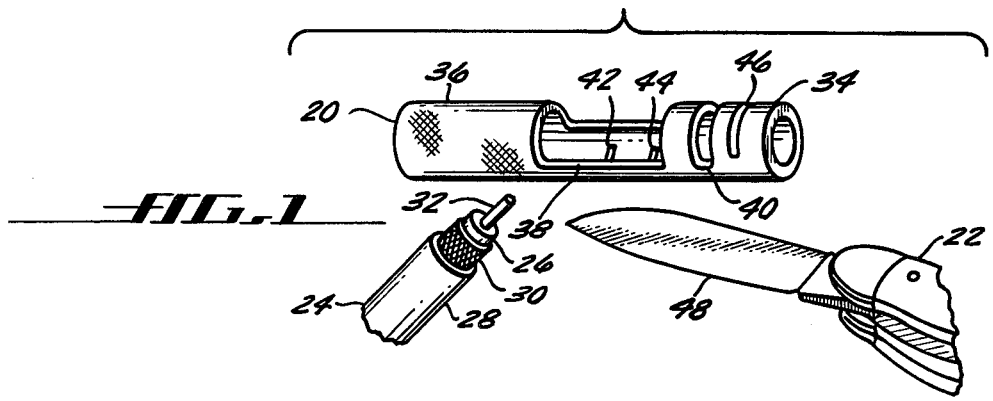
FIG. 1 is a frontal perspective view looking generally down at a cable gage and cutter guide tool constructed according to this invention, including fragmentary perspective views of a knife used with the tool and a trimmed coaxial cable resulting from such use.

FIG. 1 is a frontal perspective view of a cable gage and cutter guide tool 20 constructed according to this invention, a knife 22 which can be used with the tool, and a coaxial cable 24 that was properly trimmed using the knife and tool. The tool 20 is constructed to serve as a gage for determining whether the concentricity and outer diameter of the cable 24 and of its dielectric insulation 26 are within desired or specified limits, and also as a cutter guide for knife 22 to strip or trim the cover jacket 28, braided shield 30 and the dielectric insulation from center conductor 32 to accurate termination lengths which allow correct connector installation resulting in a good and secure connection lug on the end of the cable. The conductor 32 can be, for example, a single wire or it can be formed from several strands of smaller wires twisted together into an essentially unitary element.

The illustrated tool 20 generally comprises a tubular member 34 which was machined from, for example, a chrome steel rod of ½-inch diameter and 3½ inches length. Of course, the tubular member 34 can be made from other materials such as hard plastic, wood, etc. The tubular member 34 is cylindrically shaped and broadly includes a knurled exterior surface on the (left) end portion 36, a larger half-cylinder diametrical cutout 38, a smaller half-cylinder diametrical cutout 40, and three axially spaced (knife blade) segment slots 42, 44 and 46 which can be of the same axial width but of different segment chord depths or heights from the cylindrical surface of the tubular member. The slots 42 and 44 are located diametrically opposite to the larger cutout 38, and the slot 46 is located generally adjacent to the (right) side of the smaller cutout 40.

The knife 22 can be preferably an ordinary pocket knife having a cutting blade 48 that can be easily sharpened. Of course, other forms of cutting means such as the well known "Exacto" knife or a razor blade can be used with the tool 20. Exacto knifes are commonly used at present for cutting and trimming the coverings and sleeving of cables and wires; however, the blades of these knifes rapidly become dull after use in preparing a few cables or wires and are not conductive to re-sharpening.

Figure 2:
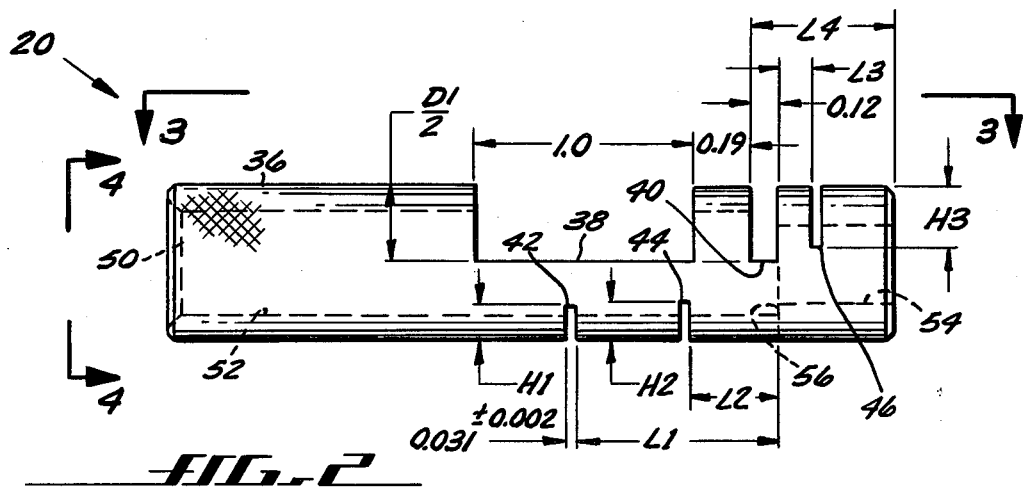
FIG. 2 is a front elevational view of the exemplary gage and guide tool shown in FIG. 1.

FIG. 2 is a front elevational view of the exemplary tool 20 shown in FIG. 1. The larger half-cylinder diametrical cutout 38 is 1.0 inch long, the smaller half-cylinder diametrical cutout 40 is 0.12 inch long, and these two larger and smaller cutouts are axially or longitudinally separated by a tubular member 34 length of 0.19 inch, for example, which prevents buckling of the cable 24 therein during the trimming operation. The transverse cutouts 38 and 40 not only allow viewing of the end of cable 24 (FIG. 1) when it is inserted into the tubular member 34 but also permit finger or thumb adjustment of, and pressure on, the exposed cable portions. This provides a highly effective and practical control of the end of the cable 24 within the tubular member 34 during cutting of the tough cover jacket 28, the hard braided (metallic) shield 30 and the tenacious dielectric insulation 26 to produce extremely smooth and even trim cuts by knife 22 held (by the right hand) with its blade 48 positioned successively in the diametrical (segment) cutting slots 42, 44 and 46. Of course, attainment of the smooth and even trim cuts is assisted significantly by the knurled end portion 36 which can be firmly held by the fingers (of the left hand) to rotate the tool 20 while the knife blade 48 is transversely positioned in the cutting slots 42, 44 and 46.

Each of the three transverse cutting slots 42, 44 and 46 can have a width of 0.031 ± 0.002 inch, for example, and the slots 42, 44 and 46 can have respective depths or heights of H1, H2 and H3. The cutouts 38 and 40 both have a depth or height of (D1)/2, and the right sides of the slots 42 and 44 are axially or longitudinally spaced from the right side of the smaller cutout 40 at distances of L1 and L2, respectively. The left side of the slot 46 is axially or longitudinally spaced from the right side of the cutout 40 at a distance of L3. The left side of the smaller cutout 40 is axially or longitudinally spaced from the right end surface of the tubular member 34 at a distance of L4. It can be noted that the tubular member 34 has a counterbored axial passageway 50 including a larger (left) axial bore 52 and a smaller (right) axial bore 54 which are separated at the diametrical plane of the right side of the cutout 40. A shoulder 56 is, of course, produced in the cross sectional junction plane at the juncture of the two axial bores 52 and 54.

Figure 3:
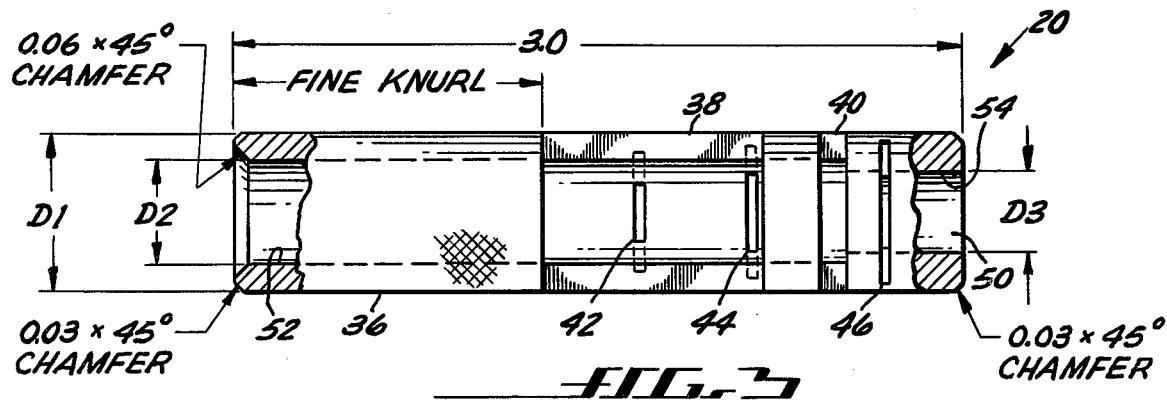
FIG. 3 is a top plan view, shown partially broken away at the ends in section, of the exemplary gage and guide tool as taken along the line 3—3 indicated in FIG. 2.

FIG. 3 is a top plan view, shown partially broken away at the ends in section, of the exemplary tool 20 as taken along the line 3—3 indicated in FIG. 2. The tubular member 34 has an overall length of 3.0 inches, and can have 0.03 inch × 45° chamfers at both radially outer end corners and an axially longer length 0.06 inch × 45° chamfer at the left radially inner end corner, for example. The tubular member 34 has an outer diameter D1, the larger bore 52 has a diameter D2, and the smaller bore 54 has a diameter D3. The diameters D1 through D3, the depths or heights H1 through H3, and axial or longitudinal lengths L1 through L4 of the tool 20 are different for various types of coaxial cables to be processed and various types of connectors to be attached or crimped to the processed cable ends. Illustrative values of these diameters, heights and lengths are given below.

| Dimension (Tolerance) | Tool Number | | | | |
| --- | --- | --- | --- | --- | --- |
| | −3 | −5 | −7 | −9 | −11 |
| D1 (±0.002) | 0.375 | 0.375 | 0.375 | 0.500 | 0.500 |
| D2 (±0.002) | 0.205 | 0.250 | 0.305 | 0.330 | 0.330 |
| D3 (±0.002) | 0.125 | 0.155 | 0.240 | 0.240 | 0.240 |
| H1 (±0.002) | 0.110 | 0.088 | 0.050 | 0.095 | 0.095 |
| H2 (±0.002) | 0.125 | 0.108 | 0.065 | 0.130 | 0.130 |
| H3 (±0.002) | 0.165 | 0.170 | 0.135 | 0.200 | 0.200 |
| L1 (±0.005) | 0.781 | 0.610 | 0.703 | 0.672 | 0.703 |
| L2 (±0.005) | 0.515 | 0.391 | 0.328 | 0.297 | 0.328 |
| L3 (±0.005) | 0.079 | 0.204 | 0.110 | 0.110 | 0.110 |
| L4 (—) | 0.56 | 0.44 | .38 | .38 | .38 |

The tool numbered -3 above (and suitably marked on the proper tool 20) is to be used with the type of coaxial cable numbered BSX-7002-58CU and types of connectors numbered 330884, 330885, 330953, 1-3322-43-5, 1-332292-3 and 1-332262-5. The tool numbered -5 is to be used with the cable type numbered BSX-7002-59U and the connector types numbered 225098-1, 3-331350-8 and 3-331351-4. Similarly, the tool number -7 is to be used with the cable type numbered 250-4207 and the connector types numbered 225092-9 and 1-225094-3. The tool numbered -9 is to be used with the cable type numbered 250-4208 and the connector types numbered 225407-8 and 225411-6. Finally, the tool numbered -11 is to be used with the cable type numbered 250-4208 and the connector types numbered 1-2250-92-0 and 1-225094-2.

Figure 4:
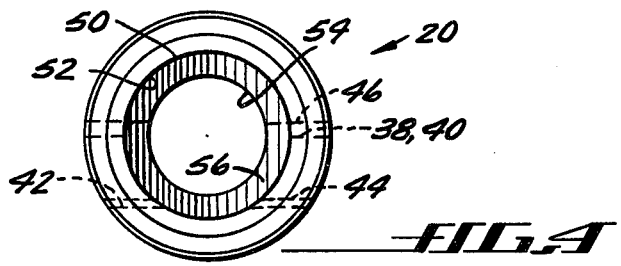
FIG. 4 is a side elevational view of the exemplary gage and guide tool as taken along the line 4—4 indicated in FIG. 2.

FIG. 4 is a side elevational view of the exemplary tool 20 as taken along the line 4—4 indicated in FIG. 2. The shoulder 56 at the juncture of the axial bores 52 and 54 can be clearly seen and, after the untrimmed end of cable 24 (FIG. 1) has been inserted into the tubular member 34 to abut on the shoulder, pressure is maintained with the thumb against the cable through the larger cutout 38 while the tubular member is rotated around the cable with a sharp knife blade 48 held successively in the cutting slots 44 and 42. Substantially continuous observation of the cutting action can be had through the cutout 38. The cable end is then withdrawn from the tubular member 34, and the jacket 28 and shield 30 end portions cut at slot 44 are removed.

The end of cable 24 is again inserted into the tubular member 34 so that the exposed insulation 26 enters the smaller bore 54 and the jacket 28 and shield 30 abut against the shoulder 56. The sharp knife blade 48 is held in the cutting slot 46 and the tubular member 34 is now rotated to cut the insulation. Thumb pressure on the cable 24 through the cutout 38 can assist in attaining a smooth and even cut of the insulation 26. Following withdrawal of the cable end from the tubular member 34, the insulation portion cut at slot 46 and the jacket portion cut at slot 42 are removed. An appropriate connection lug (not shown) can then be suitably attached or crimped to the processed end of cable 24.

The tool 20 self-inspects the cable 24 for reasonably correct concentricity and outer diameters of the jacket 28 and insulation 26. This is accomplished by the concentric series arrangement of the bores 52 and 54, and the provision of correct bore diameters D2 and D3 (FIG. 3) for the particular size of cable 24 to be processed. The bore diameters D2 and D3 are, for example, equal to the maximum tolerance sizes for standard cables established by the cable manufacturers and the layers of cable 24 should fit concentrically well in the appropriate bores 52 and 54. This can be determined within adequate limits by feel and visual inspection of the cable 24 in the tool 20.

If the jacket 28 and insulation 26 fit concentrically well in their respective bores 52 and 54, the shield 30 and conductor 32 will be sufficiently concentric with respect to the jacket and insulation under present manufacturing means and methods so that the shield and conductor would not be unintentionally cut or badly nicked by the knife blade 48. Of course, since a variety of cable sizes and connectors are normally used on modern aircraft and missiles, a set of several different sizes (tool numbers) of the tool 20 is ordinarily used. Only five differently sized tools 20 as was illustratively listed previously, however, can comprise a set which covers almost all of the different cables and connectors usually involved in any program or project.

While an exemplary embodiment of this invention has been described above and shown in the accompanying drawing, it is to be understood that such embodiment is merely illustrative of, and not restrictive on, the broad invention and that I do not desire to be limited in my invention to the details of construction or arrangement described and shown, for obvious modifications may occur to persons having ordinary skill in the art.

I claim:

1. For use in processing an end of a coaxial cable including a center conductor and radially successive layers of at least insulation and shield, a concentricity gage and cutter guide tool comprising:
a tubular member including an axial passageway having a larger bore on one side of a cross sectional junction plane through said passageway, said larger bore being of constant diameter throughout its length, and a smaller bore on the other side of said junction plane, said smaller bore being of constant diameter throughout its length, a shoulder being produced in said passageway at said junction plane, a first transverse slot in said tubular member extending a predetermined depth into said larger bore, and a second transverse slot in said tubular member extending a predetermined depth into said smaller bore whereby said shield can be cut by a cutting blade positioned in said first slot when said cable end is inserted into said larger bore to abut on said shoulder and said insulation can be cut by said cutting blade positioned in said second slot when said cable end is inserted into said larger and smaller bores with the cut end of said shield abutting on said shoulder.

2. The invention as defined in claim 1 wherein said larger and smaller bores have diameters equal to maximum tolerance sizes of said cable and insulation outer diameters, respectively, whereby concentricity and outer diameters of said cable and insulation can be gaged and verified within practical limits.

3. The invention as defined in claim 2 wherein said tubular member further includes a larger transverse cutout in said tubular member extending a predetermined depth into said larger bore, said first slot being generally located diametrically opposite to said larger cutout whereby finger pressure can be maintained against said cable end during cutting of said layers thereof.

4. The invention as defined in claim 1 wherein said tubular member further includes a larger transverse cutout in said tubular member extending a predetermined depth into said larger bore, said first slot being generally located diametrically opposite to said larger cutout whereby finger pressure can be maintained against said cable end during cutting of said layers thereof.

5. The invention as defined in claim 4 wherein said tubular member further includes a smaller transverse cutout in said tubular member extending a predetermined depth into said larger bore and axially spaced a predetermined distance from said larger cutout to produce a separating length of said tubular member to assist in preventing buckling of said cable end during cutting of said layers thereof.

6. The invention as defined in claim 1 wherein said cable includes a center conductor and radially successive layers of insulation, shield and jacket, and said tubular member further includes a third transverse slot in said tubular member extending a predetermined depth into said larger bore and axially spaced a predetermined distance from said first slot whereby said jacket and shield can be cut by said cutting blade positioned in said first slot and only said jacket can be cut by said cutting blade positioned in said third slot when said cable end is inserted into said larger bore to abut on said shoulder.

7. The invention as defined in claim 6 wherein said larger and smaller bores have diameters equal to maximum tolerances sizes of said cable and insulation outer diameters, respectively, whereby concentricity and outer diameters of said cable and insulation can be gaged and verified within practical limits.

8. The invention as defined in claim 7 wherein said tubular member further includes a larger transverse cutout in said tubular member extending a predetermined depth into said larger bore, said first and third slots being generally located diametrically opposite to said larger cutout whereby finger pressure can be maintained against said cable end during cutting of said layers thereof.

9. The invention as defined in claim 6 wherein said tubular member further includes a larger transverse cutout in said tubular member extending a predetermined depth into said larger bore, said first and third slots being generally located diametrically opposite to said larger cutout whereby finger pressure can be maintained against said cable end during cutting of said layers thereof.

10. The invention as defined in claim 9 wherein said tubular member further includes a smaller transverse cutout in said tubular member extending a predetermined depth into said larger bore and axially spaced a predetermined distance from said larger cutout to produce a separating length of said tubular member to assist in preventing buckling of said cable end during cutting of said layers thereof.

* * * * *